(12) United States Patent
Lin

(10) Patent No.: US 9,033,513 B2
(45) Date of Patent: May 19, 2015

(54) PROJECTION DEVICE AND LIGHT SOURCE DEVICE THEREOF

(75) Inventor: Hung-Ying Lin, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 129 days.

(21) Appl. No.: 13/371,481

(22) Filed: Feb. 13, 2012

(65) Prior Publication Data

US 2013/0021583 A1    Jan. 24, 2013

(30) Foreign Application Priority Data

Jul. 19, 2011    (TW) .............................. 100125375 A

(51) Int. Cl.
  G03B 21/00    (2006.01)
  G03B 21/20    (2006.01)
  G03B 33/06    (2006.01)
  H04N 9/31     (2006.01)

(52) U.S. Cl.
  CPC .......... *G03B 21/2033* (2013.01); *G03B 21/208* (2013.01); *G03B 33/06* (2013.01); *H04N 9/3152* (2013.01); *H04N 9/3176* (2013.01)

(58) Field of Classification Search
  CPC ............ G03B 1/208; G03B 1/21; G03B 1/28; G02B 27/141; G02B 27/123; G02B 27/0961
  USPC ................................................ 353/31, 33, 38
  See application file for complete search history.

(56) References Cited

U.S. PATENT DOCUMENTS

| 6,257,726 | B1 | 7/2001 | Okuyama | |
|---|---|---|---|---|
| 2003/0043468 | A1* | 3/2003 | Cha | 359/618 |
| 2005/0219847 | A1* | 10/2005 | Ikeda et al. | 362/268 |
| 2006/0146292 | A1* | 7/2006 | Lin | 353/33 |
| 2006/0164600 | A1* | 7/2006 | Morejon et al. | 353/31 |
| 2007/0121085 | A1* | 5/2007 | Dewald | 353/99 |
| 2009/0190101 | A1* | 7/2009 | Alasaarela et al. | 353/81 |
| 2011/0181839 | A1* | 7/2011 | Kawamoto et al. | 353/30 |

FOREIGN PATENT DOCUMENTS

| CN | 1677226 A | 10/2005 |
|---|---|---|
| CN | 100510947 C | 7/2009 |
| CN | 201464788 U | 5/2010 |
| JP | 2000147658 A | 5/2000 |
| JP | 2004029325 A | 1/2004 |
| JP | 2008134324 A | 6/2008 |
| TW | 200625949 | 7/2006 |
| TW | M367356 U | 10/2009 |
| TW | 201043842 A | 12/2010 |
| WO | 2010116725 A1 | 10/2010 |

* cited by examiner

*Primary Examiner* — Sultan Chowdhury
*Assistant Examiner* — Danell L Owens
(74) *Attorney, Agent, or Firm* — CKC & Partners Co., Ltd.

(57) ABSTRACT

A light source device includes at least one light emitting diode, at least one dichroic mirror, a condenser, and a fly's eye device. The light emitting diode is operable to generate at least one kind of light. The dichroic mirror is disposed corresponding to the light emitting diode to combine the light into an optical path when the light passes through the dichroic mirror. The condenser is disposed corresponding to the dichroic mirror to gather the light when the light passes through the condenser. The fly's eye device is disposed corresponding to the condenser to homogenize the light when the light passes through the fly's eye device. Furthermore, a projection device is disclosed herein.

6 Claims, 3 Drawing Sheets

PROJECTION DEVICE AND LIGHT SOURCE DEVICE THEREOF

RELATED APPLICATIONS

This application claims priority to Taiwan Application Serial Number 100125375, filed Jul. 19, 2011, which is herein incorporated by reference.

BACKGROUND

1. Field of Invention

The embodiment of the present invention relates generally to a displaying device and, more particularly, to a projection device.

2. Description of Related Art

In order to reduce the size of a small projection device that utilizes light emitting diodes, a fly's eye device is typically used in the small projection device as an optical element. When the Etendue entering a camera lens by reflection of a digital micromirror device is less than the Etendue of a light emitting diode(s), the light entering a fly's eye device through a collimator can not be transformed by the fly's eye device completely so that a significant amount of power is consumed.

Hence, existing apparatuses and techniques still have obvious defects and need further improvement. In order to solve the above problems, those skilled in the art are endeavoring to find a solution, but no suitable method has been proposed. Therefore, an important area of study and one that is in need of improvement is that related to the inability to effectively use of light generated by a light emitting diode which results in additional power consumption.

SUMMARY

A light source device is provided which addresses the problem of the inability to effectively use of light generated by a light emitting diode which causes additional power consumption.

Thus, one aspect of the embodiment of the present invention is to provide a light source device. The light source device comprises at least one light emitting diode, at least one dichroic mirror, a condenser and a fly's eye device. The light emitting diode is operable to generate at least one kind of light. The dichroic mirror is disposed corresponding to the light emitting diode and combines the light into the same optical path when the light passes through the dichroic mirror. The condenser is disposed corresponding to the dichroic mirror and gathers the light when the light passes through the condenser. The fly's eye device is disposed corresponding to the condenser and homogenizes the light when the light passes through the fly's eye device.

In one embodiment of the present invention, the fly's eye device comprises a plurality of small lenses. The small lenses generate a plurality of images when the light passes through the small lenses.

In another embodiment of the present invention, the light source device further comprises a concave condenser and a group of condensers. The concave condenser is disposed corresponding to the fly's eye device and makes the images generated by the fly's eye device display on the digital micromirror device and overlap each other when the images pass through the concave condenser. The group of the condensers is disposed corresponding to the concave condenser. The group of the condensers comprises a first condenser and a second condenser, and the first condenser and the second condenser are disposed to control the angular magnification of the light source device.

In yet another embodiment of the present invention, the light source device further comprises a digital micromirror device and a reverse total internal reflection prism. The digital micromirror device is disposed corresponding to the fly's eye device. The reverse total internal reflection prism is disposed before the digital micromirror device in the optical path and projects the light on the digital micromirror device when the light passes through the reverse total internal reflection prism. The digital micromirror device controls the light to enter the reverse total internal reflection prism again, and the light source device projects the light on a screen through a camera lens.

In still another embodiment of the present invention, the light source device further comprises at least one collimator. The collimator is disposed before the dichroic mirror in the optical path. The light is caused to become parallel to each other when the light passes through the collimator.

In yet another embodiment of the present invention, the light emitting diode comprises a red light emitting diode, a green light emitting diode, and a blue light emitting diode. The red light emitting diode, the green light emitting diode, and the blue light emitting diode generate a red light, a green light, and a blue light respectively.

In another aspect of the embodiment of the present invention, a projection device is provided. The projection device comprises at least one light emitting diode, at least one collimator, at least one dichroic mirror, a condenser, a fly's eye device, a digital micromirror device, and a reverse total internal reflection prism. The light emitting diode generates at least one kind of light. The collimator is dispose corresponding to the light emitting diode. The light is caused to become parallel to each other when the light passes through the collimator. The dichroic mirror is disposed corresponding to the collimator and combines the light into the same optical path when the light passes through the dichroic mirror.

Furthermore, the condenser is disposed corresponding to the dichroic mirror and gathers the light when the light passes through the condenser. The fly's eye device is disposed corresponding to the condenser and homogenizes the light when the light passes through the fly's eye device. The digital micromirror device is disposed corresponding to the fly's eye device. The reverse total internal reflection prism is disposed before the digital micromirror device in the optical path and projects the light on the digital micromirror device when the light passes through the reverse total internal reflection prism. The digital micromirror device controls the light to enter the reverse total internal reflection prism again, and the projection device projects the light on a screen through the camera lens.

In one embodiment of the present invention, the fly's eye device comprises a plurality of small lenses. The small lenses generate a plurality of images when the light passes through the small lenses.

In another embodiment of the present invention, the projection device further comprises a concave condenser and a group of condensers. The concave condenser is disposed corresponding to the fly's eye device and makes the images generated by the fly's eye device display on the digital micromirror device and overlap each other when the images pass through the concave condenser. The group of condensers is disposed corresponding to the concave condenser. The group of the condensers comprises a first condenser and a second condenser, and the first condenser and the second condenser are disposed to control the angular magnification of the projection device.

In yet another embodiment of the present invention, the light emitting diode comprises a red light emitting diode, a green light emitting diode, and a blue light emitting diode. The red light emitting diode, the green light emitting diode, and the blue light emitting diode generate a red light, a green light, and a blue light respectively.

In summary, the embodiments of the present invention provide a light source device or a projection device for addressing the problem of the inability to effectively use light generated by a light emitting diode which results in additional power consumption.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
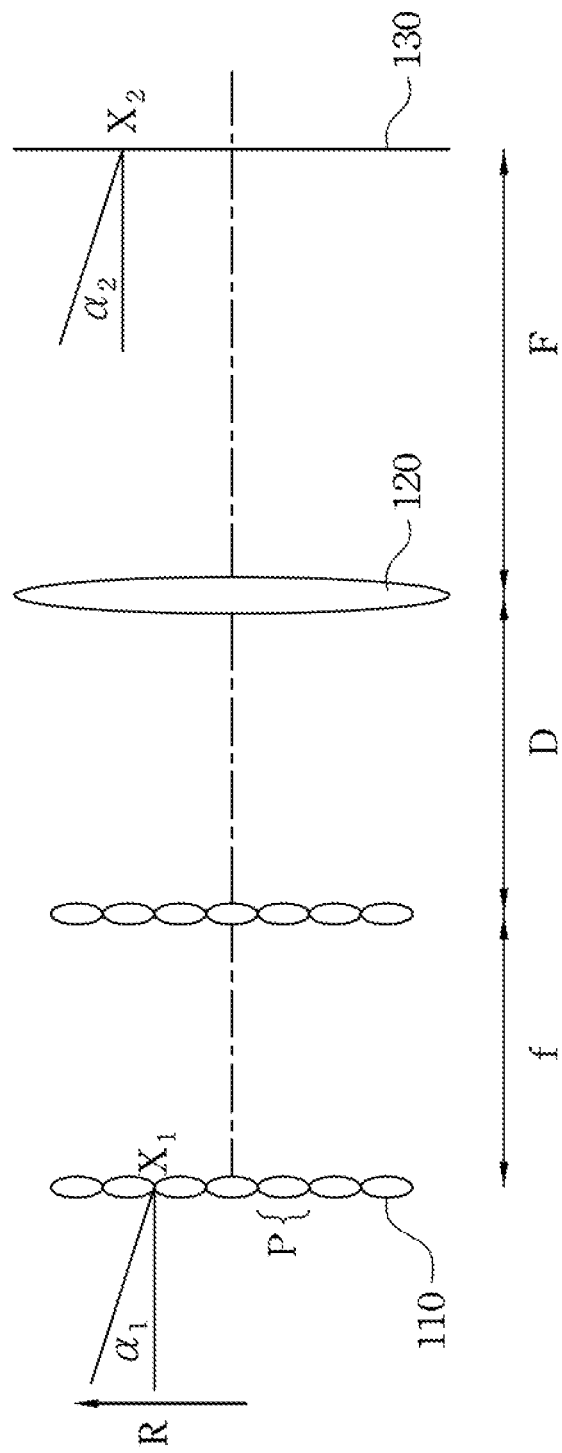
FIG. 1 schematically shows a diagram of an optical element of a light source device according to embodiments of the present invention.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a," "an," and "the" includes plural reference unless the context clearly dictates otherwise. Also, as used in the description herein and throughout the claims that follow; the meaning of "in" includes "in" and "on" unless the context clearly dictates otherwise.

The terms used in this specification generally have their ordinary to meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used herein, "around," "about" or "approximately" shall generally mean within 20 percent, preferably within 10 percent, and more preferably within 5 percent of a given value or range. Numerical quantities given herein are approximate, meaning that the term "around," "about" or "approximately" can be inferred if not expressly stated.

As used herein, the terms "comprising," "including," "having," "containing," "involving," and the like are to be understood to be open-ended, i.e., to mean including but not limited to.

FIG. 1 schematically shows a diagram of an optical element of a light source device according to embodiments of the present invention.

As shown in FIG. 1, the focal length of a fly's eye device 110 is given as f, and the focal length of a Fourier lens 120 is given as F. The light passing through the fly's eye device 110 is displayed on a digital micromirror device 130. Assuming that the cone angle of the light range X1 on the fly's eye device 110 is $\alpha 1$, the cone angle of the light range X2 on the digital micromirror device 130 is $\alpha 2$, and the pitch of the fly's eye device 110 is p, the following formula may be obtained:

$$\begin{pmatrix} \alpha 2 \\ x2 \end{pmatrix} = \begin{bmatrix} \begin{pmatrix} 1 & 0 \\ F & 1 \end{pmatrix} \begin{pmatrix} 1 & -\frac{1}{F} \\ 0 & 1 \end{pmatrix} \begin{pmatrix} 1 & 0 \\ D & 1 \end{pmatrix} \begin{pmatrix} 0 \\ -np \end{pmatrix} + \begin{pmatrix} 1 & -\frac{1}{f} \\ 0 & 1 \end{pmatrix} \begin{pmatrix} 1 & 0 \\ f & 1 \end{pmatrix} \begin{pmatrix} 1 & -\frac{1}{f} \\ 0 & 1 \end{pmatrix} \begin{pmatrix} \alpha 1 \\ x1 \end{pmatrix} \end{bmatrix}$$

The formula as shown above is arranged into another formula as shown below:

$$\begin{pmatrix} \alpha 2 \\ x2 \end{pmatrix} = \begin{pmatrix} x1 \left( \frac{D}{F} - 1 \right) & -\frac{1}{F} (\alpha 1 f - np) \\ & -\frac{F}{f} x1 \end{pmatrix}$$

When D=F, the optical element can make the light projected on the digital micromirror device 130 parallel to each other. Hence, $$-\frac{1}{F}(\alpha 1 f \ -np) = \alpha 2 = \text{the maximum value of}$$

the turnover angle of the digital micromirror device.

When $\alpha 1 \geq p/2f$, $R/F \approx \alpha 2$=the maximum value of the turnover angle of the digital micromirror device (R is the light range entering the fly's eye device 110). As a result, in order to reduce the size of the optical element, F must be made shorter, that is, R must be reduced. LED light is processed by a collimator so that the RGB light has a high reflection rate when passed through a dichroic mirror. However, $\alpha 1$ is too small (<p/2f). A condenser of the embodiment of the present invention can reduce the light range so that R is about equal to the width of the digital micromirror device 130. At this time, when $\alpha 1 \geq p/2f$, the volume and the light transforming rate are optimized.

Figure 2:
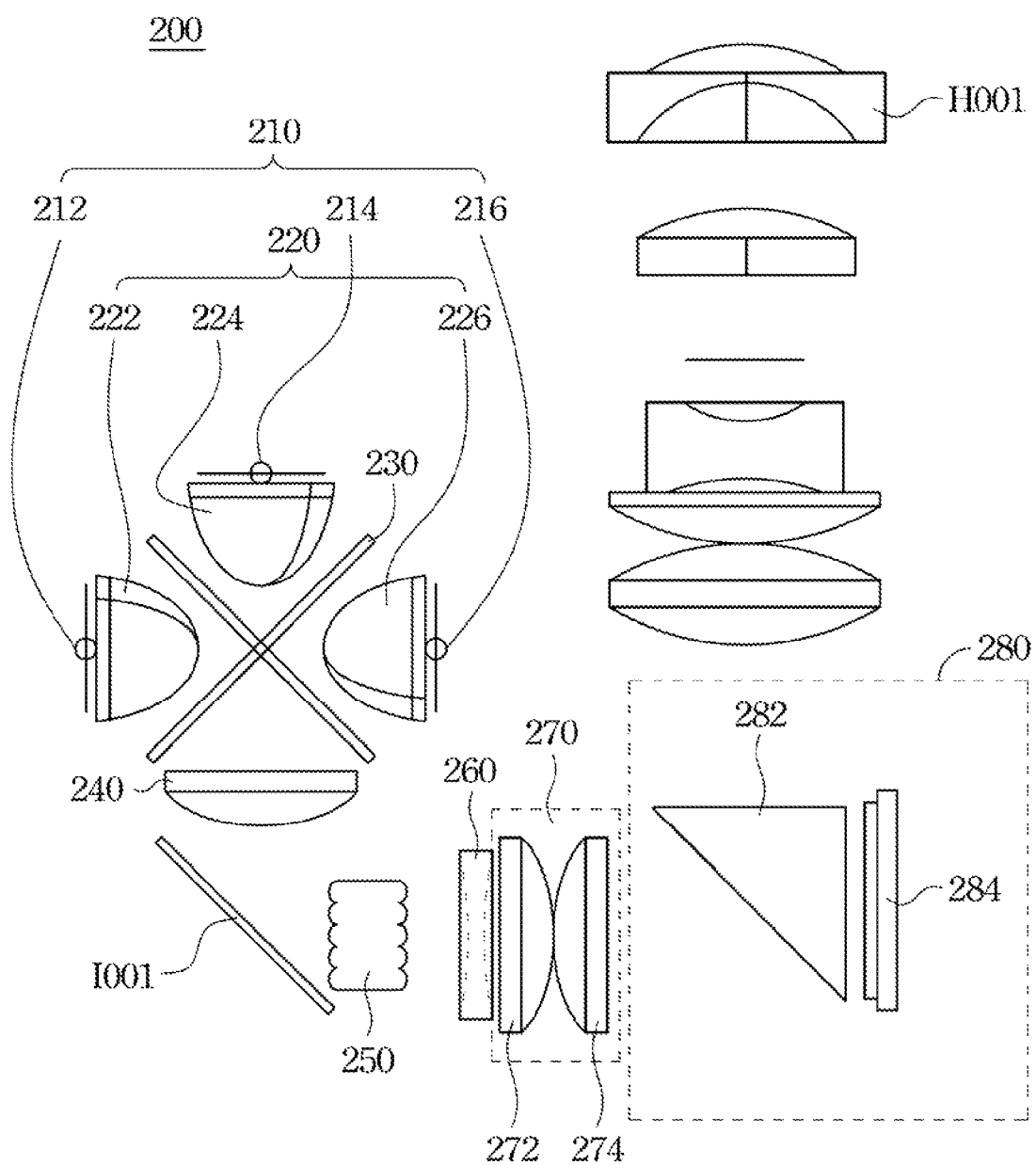
FIG. 2 schematically shows a diagram of a light source device according to embodiments of the present invention.

FIG. 2 schematically shows a diagram of a light source device 200 according to embodiments of the present invention. The light source device 200 comprises at least one light emitting diode 210, at least one dichroic mirror 230, a condenser 240, and a fly's eye device 250. The light emitting diode 210 is operable to generate at least one kind of light. The dichroic mirror 230 is disposed corresponding to the light emitting diode 210 and combines the light into the same optical path when the light passes through the dichroic mirror 230. The condenser 240 is disposed corresponding to the dichroic mirror 230 and gathers the light when the light passes through the condenser 240. The fly's eye device 250 is disposed corresponding to the dichroic mirror 230 and homogenizes the light when the light passes through the fly's eye device 250.

As described above, the condenser 240 of the embodiment of the present invention gathers the light. As a result, the light range formed by the light entering the fly's eye device 250 can be reduced. Hence, the size of the fly's eye device 250 can be reduced so as to, ultimately, minimize the size of the light source device 200.

In one embodiment, the fly's eye device 250 comprises a plurality of small lenses (as shown by the fly's eye device 110 in FIG. 1). A plurality of images are generated when the light passes through the small lenses of the fly's eye device 250.

Moreover, the light source device 200 can further comprise a concave condenser 260 and a group of condensers 270. The concave condenser 260 is disposed corresponding to the fly's eye device 250 and makes the images generated by the fly's eye device 250 display on the digital micromirror device 290 and overlap each other when the images pass through the concave condenser 260. The group of condensers 270 is disposed corresponding to the concave condenser 260. The group of condensers 270 comprises a first condenser 272 and a second condenser 274, and the first condenser 272 and the second condenser 274 are disposed to control the angular magnification of the light source device 200.

In another embodiment, the light source device 200 can further comprise a digital micromirror device 290 and a reverse total internal reflection prism 280. The digital micromirror device 290 is disposed corresponding to the fly's eye device 250. The reverse total internal reflection prism 280 is disposed before the digital micromirror device 290 in the optical path and projects the light on the digital micromirror device 290 when the light passes through the reverse total internal reflection prism 280. The digital micromirror device 290 controls the light so that it enters the reverse total internal reflection prism 280 again, and the light source device 200 projects the light on a screen (not shown in FIG. 2) through a camera lens H001.

Hence, the condenser 240 of the embodiment of the present invention can regulate the light range formed by the light entering the fly's eye device 250 so that said light range is equal to the width of the digital micromirror device 290. At this time, the light transforming rate is optimized.

In yet another embodiment, the light source device 200 can further comprise at least one collimator 220. The collimator 220 is disposed before the dichroic mirror 230 in the optical path. The light is caused to become parallel to each other when the light passes through the collimator 220.

In some embodiments, the light emitting diode 210 of the light source device 200 comprises a red light emitting diode 212, a green light emitting diode 214, and a blue light emitting diode 216, and the collimator 220 comprises a first collimator 222, a second collimator 224, and a third collimator 226. The red light emitting diode 212, the green light emitting diode 214, and the blue light emitting diode 216 generate a red light, a green light, and a blue light respectively. The red light, the green light, and the blue light are caused to become parallel to each other when the red light, the green light, and the blue light pass through the first collimator 222, the second collimator 224, and the third collimator 226 respectively. Moreover, the dichroic mirror 230 combines the red light, the green light, and the blue light into the same optical path.

Figure 3:
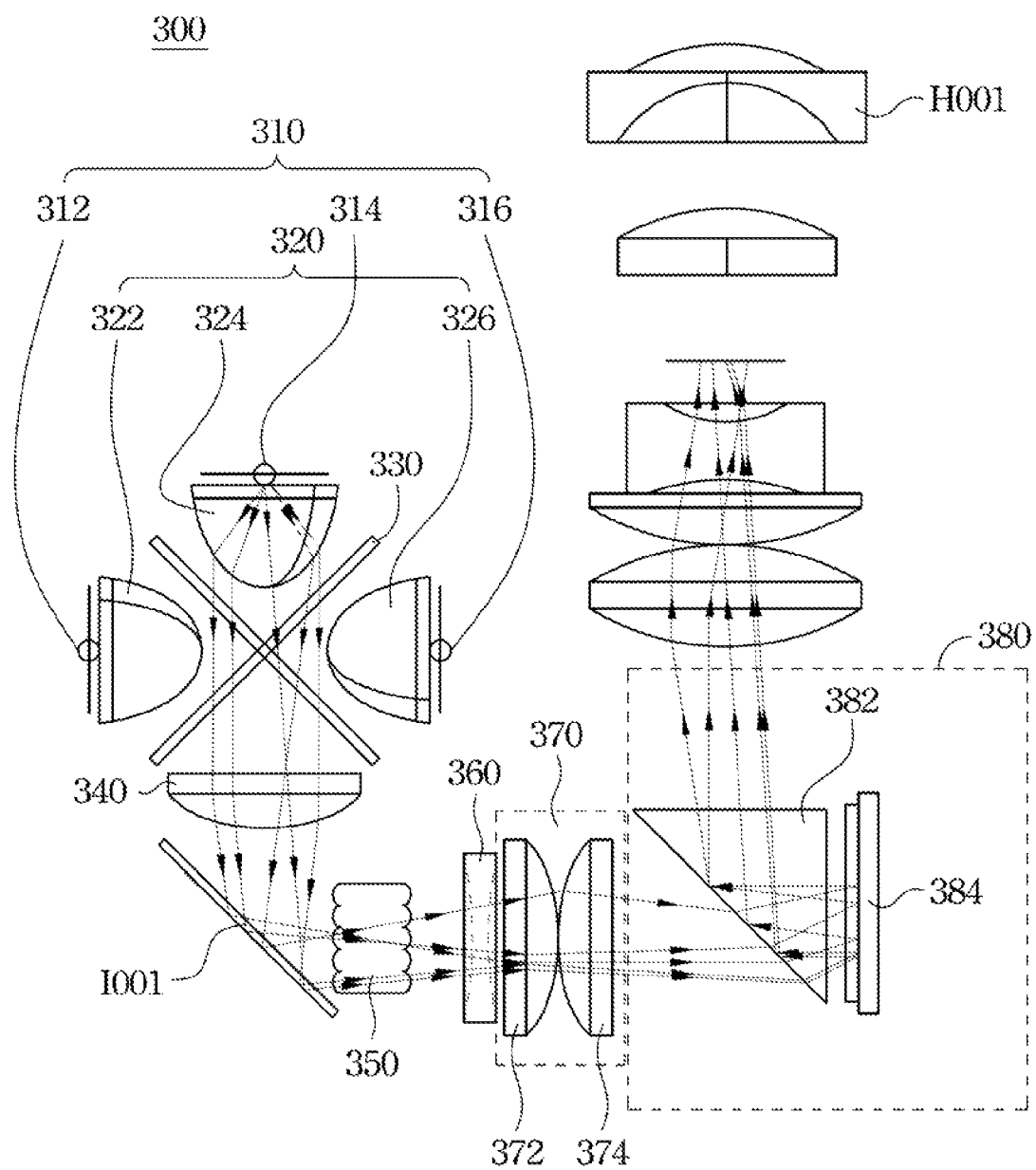
FIG. 3 schematically shows a diagram of a projection device according to embodiments of the present invention.

FIG. 3 schematically shows a diagram of a projection device 300 and an optical path thereof according to embodiments of the present invention.

Referring to FIG. 3, the projection device 300 comprises at least one light emitting diode 310, at least one collimator 320, at least one dichroic mirror 330, a condenser 340, a fly's eye device 350, a digital micromirror device 390, and a to reverse total internal reflection prism 380. The light emitting diode 310 is operable to generate at least one kind of light. The collimator 320 is disposed corresponding to the light emitting diode 310. The light is caused to become parallel to each other when the light passes through the collimator 320. The dichroic mirror 330 is disposed corresponding to the collimator 320 and combines the light into the same optical path when the light passes through the dichroic mirror 330.

In some embodiments, the light emitting diode 310 of the projection device 300 comprises a red light emitting diode 312, a green light emitting diode 314, and a blue light emitting diode 316, and the collimator 320 comprises a first collimator 322, a second collimator 324, and a third collimator 326. The red light emitting diode 312, the green light emitting diode 314, and the blue light emitting diode 316 generate a red light, a green light, and a blue light respectively. The red light, the green light, and the blue light are caused to become parallel to each other when the red light, the green light, and the blue light pass through the first collimator 322, the second collimator 324, and the third collimator 326 respectively. Moreover, the dichroic mirror 330 combines the red light, the green light, and the blue light into the same optical path.

Furthermore, the condenser 340 is disposed corresponding to the dichroic mirror 330 and gathers the light when the light passes through the condenser 340. The light gathered by the condenser 340 in the same optical path is reflected by the reflection mirror 1001 to project on the fly's eye device 350. The fly's eye device 350 is disposed corresponding to the condenser 340 and homogenizes the light when the light passes through the fly's eye device.

As described above, the condenser 340 of the embodiment of the present invention gathers the light. As a result, the light range formed by the light entering the fly's eye device 350 can be reduced. Hence, the size of the fly's eye device 350 can be reduced so as to, ultimately, minimize, the size of the projection device 300.

Furthermore, the digital micromirror device 390 is disposed corresponding to the fly's eye device 350. The reverse total internal reflection prism 380 is disposed before the digital micromirror device 390 in the optical path and projects the light on the digital micromirror device 390 when the light passes through the reverse total internal reflection prism 380. The digital micromirror device 390 controls the light so that it enters the reverse total internal reflection prism 380 again, and the projection device 300 projects the light on a screen (not shown in FIG. 3) through a camera lens H001.

Hence, the condenser 340 of the embodiment of the present invention can regulate the light range formed by the light entering the fly's eye device 350 so that said light range is equal to the width of the digital micromirror device 390. At this time, the light transforming rate is optimized.

In one embodiment, the fly's eye device 350 comprises a plurality of small lenses. A plurality of images are generated when the light passes through the small lenses.

In an optional embodiment, the projection device 300 can further comprise a concave condenser 360 and a group of condensers 370. The concave condenser 360 is disposed corresponding to the fly's eye device 350 and makes the images generated by the fly's eye device 350 display on the digital micromirror device 390 and overlap each other when the images pass through is the concave condenser 360. The group of condensers 370 is disposed corresponding to the concave condenser 360. The group of the condensers 370 comprises a first condenser 372 and a second condenser 374, and the first condenser 372 and the second condenser 374 are disposed to control the angular magnification of the projection device 300.

In view of the foregoing embodiments of the present invention, many advantages of the present invention are now apparent. The embodiment of the present invention provides a light source device 200 or a projection device 300. The condenser 240, 340 of the embodiment of the present invention can regulate the light range formed by the light entering the fly's eye device 250, 350 so that said light range is equal to the width of the digital micromirror device 290, 390. At this time, the light transforming rate is optimized so as to address the problem of the inability to effectively use the light generated by a light emitting diode which results in additional power consumption.

In addition, the condenser 240, 340 of the embodiment of the present invention gathers the light so that the light range formed by the light entering the fly's eye device 250, 350 can be reduced. Hence, the size of the fly's eye device 250, 350 can be reduced so as to minimize the size of the light source device 200 or the projection device 300.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention, and the scope thereof is determined by the claims that follow.

What is claimed is:

1. A light source device, comprising:
    at least one light emitting diode for generating at least one kind of light;
    at least one dichroic mirror disposed corresponding to the light emitting diode for combining the light into the same optical path when the light passes through the dichroic mirror;
    a condenser disposed corresponding to the dichroic mirror for gathering the light when the light passes through the condenser;
    a fly's eye device disposed corresponding to the condenser for homogenizing the light when the light passes through the fly's eye device, wherein the condenser is disposed between the dichroic mirror and the fly's eye device, wherein the fly's eye device comprises a plurality of small lenses for generating a plurality of images when the light passes through the small lenses;
    a concave condenser disposed corresponding to the fly's eye device for making the images generated by the fly's eye device display on the digital micromirror device and overlap each other when the images pass through the concave condenser; and
    a group of condensers disposed corresponding to the concave condenser, wherein the group of the condensers comprises a first condenser and a second condenser, and the first condenser and the second condenser are disposed to control the angular magnification of the light source device.

2. The light source device according to claim 1, further comprising:
    a digital micromirror device disposed corresponding to the fly's eye device; and
    a reverse total internal reflection prism disposed before the digital micromirror device in the optical path for projecting the light on the digital micromirror device when the light passes through the reverse total internal reflection prism, wherein the digital micromirror device controls the light to enter the reverse total internal reflection prism again, and the light source device projects the light on a screen through a camera lens.

3. The light source device according to claim 1, further comprising:
    at least one collimator disposed before the dichroic mirror in the optical path, wherein the light is caused to become parallel to each other when the light passes through the collimator.

4. The light source device according to claim 1, wherein the light emitting diode comprises:
    a red light emitting diode, a green light emitting diode and a blue light emitting diode for generating a red light, a green light and a blue light respectively.

5. A projection device, comprising:
    at least one light emitting diode for generating at least one kind of light;
    at least one collimator disposed corresponding to the light emitting diode, wherein the light is caused to become parallel to each other when the light passes through the collimator;
    at least one dichroic mirror disposed corresponding to the collimator for combining the light into the same optical path when the light passes through the dichroic mirror;
    a condenser disposed corresponding to the dichroic mirror for gathering the light when the light passes through the condenser;
    a fly's eye device disposed corresponding to the condenser for homogenizing the light when the light passes through the fly's eye device, wherein the condenser is disposed between the dichroic mirror and the fly's eye device, wherein the fly's eye device comprises a plurality of small lens for generating a plurality of images when the light passes through the small lenses;
    a digital micromirror device disposed corresponding to the fly's eye device;
    a concave condenser disposed corresponding to the fly's eye device for making the images generated by the fly's eye device display on the digital micromirror device and overlap each other when the images pass through the concave condenser;
    a group of condensers disposed corresponding to the concave condenser, wherein the group of the condensers comprises a first condenser and a second condenser, and the first condenser and the second condenser are disposed to control the angular magnification of the projection device; and
    a reverse total internal reflection prism disposed before the digital micromirror device in the optical path for projecting the light on the digital micromirror device when the light passes through the reverse total internal reflection prism, wherein the digital micromirror device controls the light to enter the reverse total internal reflection prism again, and the projection device projects the light on a screen through the camera lens.

6. The projection device according to claim 5, wherein the light emitting diode comprises:
    a red light emitting diode, a green light emitting diode and a blue light emitting diode for generating a red light, a green light and a blue light respectively.

* * * * *